United States Patent [19]
Honda

[11] Patent Number: 5,991,892
[45] Date of Patent: Nov. 23, 1999

[54] NETWORK SERVER REDUNDANCY CONFIGURATION METHOD AND SYSTEM

[75] Inventor: Masahiko Honda, Tokyo, Japan

[73] Assignee: NEC Corporation, Tokyo, Japan

[21] Appl. No.: 08/872,741

[22] Filed: Jun. 11, 1997

[30] Foreign Application Priority Data

Jun. 11, 1997 [JP] Japan .................................. 8-148927

[51] Int. Cl.$^6$ .................................................. G06F 11/00
[52] U.S. Cl. ................................................. 714/4; 714/56
[58] Field of Search .................... 395/182.01, 200.11, 395/200.69; 370/395, 396; 345/355; 714/3, 4, 10, 11, 43, 56

[56] References Cited

U.S. PATENT DOCUMENTS

| | | | |
|---|---|---|---|
| 5,638,365 | 6/1997 | Duault et al. | 370/395 |
| 5,673,263 | 9/1997 | Basso et al. | 370/396 |
| 5,694,547 | 12/1997 | Subramanian et al. | 395/200.11 |
| 5,734,652 | 3/1998 | Kwok | 370/395 |
| 5,777,994 | 7/1998 | Takihiro et al. | 370/395 |
| 5,808,614 | 9/1998 | Nagahara et al. | 345/355 |
| 5,838,924 | 11/1998 | Anderson et al. | 395/200.69 |

FOREIGN PATENT DOCUMENTS

| | | |
|---|---|---|
| 61-198945 | 9/1986 | Japan . |
| 61-210470 | 9/1986 | Japan . |
| 63-107335 | 5/1988 | Japan . |
| 2-309734 | 12/1990 | Japan . |
| 3-174849 | 7/1991 | Japan . |
| 3-234136 | 10/1991 | Japan . |
| 4-14925 | 1/1992 | Japan . |
| 7-46808 | 5/1995 | Japan . |
| 7-118723 | 12/1995 | Japan . |

OTHER PUBLICATIONS

D. Comer et al., *Internetworking With TCP/IP*, vol. III: Client–Server Programming And Applications, 1993, Prentice–Hall, Inc., pp. 9–17.

*Primary Examiner*—Joseph E. Palys
*Assistant Examiner*—Nguyen Xuan Nguyen
*Attorney, Agent, or Firm*—Sughrue, Mion, Zinn, Macpeak & Seas, PLLC

[57] ABSTRACT

In a network server redundancy configuration method of executing a client-server application to allow a client terminal to use services provided by a plurality of server terminals, the client terminal is connected to each server terminal through an ATM (Asynchronous Transfer Mode) network. Switching control is performed on the server terminal connected to the client terminal by controlling the virtual channel to which an ATM cell belongs in the client terminal or the ATM network. A network server redundancy configuration system is also disclosed.

3 Claims, 4 Drawing Sheets

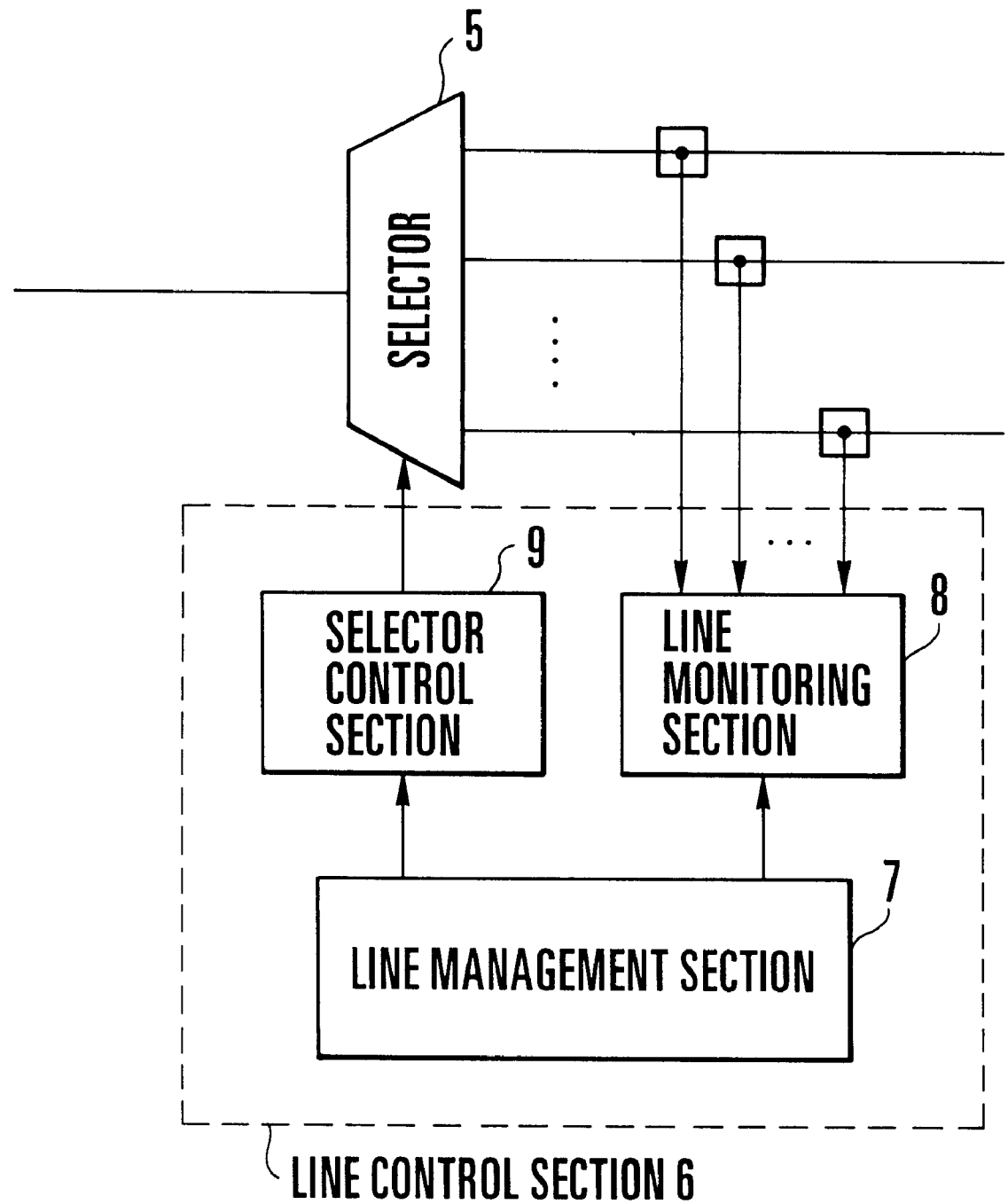
F I G. 2

NETWORK SERVER REDUNDANCY CONFIGURATION METHOD AND SYSTEM

BACKGROUND OF THE INVENTION

The present invention relates to a client-server application execution method and system which allow clients to use services provided by servers on an ATM (Asynchronous Transfer Mode) network and, more particularly, to a network server redundancy configuration method and system which effectively operate when a server fails.

A system for performing communication between clients and servers by using TCP/IP (Transmission Control Protocol/Internet Protocol) as a protocol for connection between different types of computer systems has recently been proposed. In this case, the "client" is a computer terminal which starts peer-to-peer communication in accordance with an application program, and the "server" is a computer terminal which receives a communication request from the client and provides a required service in accordance with a server program.

In a conventional client-server application execution system in which clients use services provided by servers on a network, only one server on the network provides a specific service for a given client at a given time. If, therefore, the server that is providing the service fails, the client cannot receive the service. In this case, the client uses an alternative server. This server switching operation is performed in accordance with an application program which operates on the client.

In the system having the above network server redundancy configuration, an application program must store the address information and the like of all the servers on the network to switch servers, and must execute a procedure for connecting a new server. For this reason, a switching operation cannot be performed at high speed. Furthermore, since the application program also performs switching processing, the throughput of the program decreases.

SUMMARY OF THE INVENTION

It is an object of the present invention to provide a network server redundancy configuration method and system which use an ATM network and realize server switching control without imposing any load on an application program.

In order to achieve the object, according to the present invention, there is provided a network server redundancy configuration method of executing a client-server application to allow a client terminal to use services provided by a plurality of server terminals, comprising the steps of connecting the client terminal to the server terminal through an ATM (Asynchronous Transfer Mode) network, and performing switching control on the server terminal connected to the client terminal by controlling a virtual channel to which an ATM cell belongs in one of the client terminal and the ATM network.

BRIEF DESCRIPTION OF THE DRAWINGS

FIG. 2 is a block diagram showing a line control section in FIG. 1;

DESCRIPTION OF THE PREFERRED EMBODIMENTS

The present invention will be described in detail below with reference to the accompanying drawings.

Figure 1:
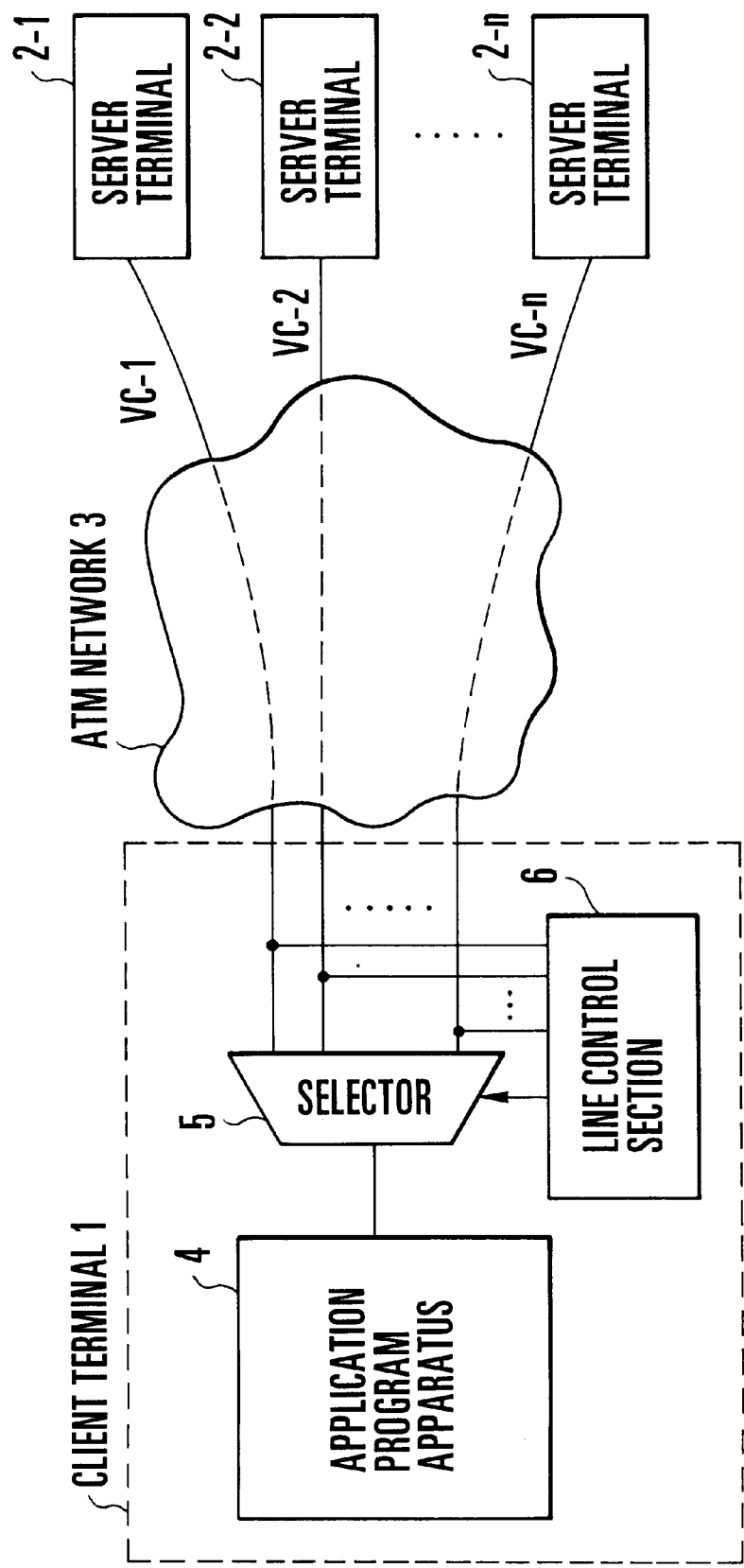
FIG. 1 is a block diagram showing the schematic arrangement of a network server redundancy configuration system according to the first embodiment of the present invention.

FIG. 1 shows the schematic arrangement of a network server redundancy configuration system according to an embodiment of the present invention. Referring to FIG. 1, the system of this embodiment comprises a client terminal 1, a plurality of server terminals 2-1 to 2-n, and an ATM network 3 for connecting the client and server terminals to each other. The client terminal 1 includes an application program apparatus 4, a selector 5 for connecting the application program apparatus 4 to the ATM network 3, and a line control section 6 for controlling the selector 5.

As shown in FIG. 2, the line control section 6 includes a line monitoring section 8 connected to a plurality of lines on the ATM network side to monitor the server terminals and the line states, a selector control section 9 for controlling the selector 5 on the basis of the monitoring result from the line monitoring section 8, and a line management section 7 for controlling the operations of the line monitoring section 8 and the selector control section 9.

With the above system configuration, lines are formed for the servers 2-1 to 2-n by setting virtual channels (VCs) VC-1 to VC-n in correspondence with the respective server terminals by using the ATM network 3.

In addition, the selector 5 is arranged in the client terminal 1 connected to the ATM network 3 to allow connection between one client terminal and many server terminals. That is, the client terminal 1 is connected to one of a plurality of server terminals by using a plurality of VCs on the ATM network 3. For this purpose, the respective VCs are connected to different server terminals. Referring to FIG. 1, in the client terminal 1, the respective VCs are accommodated in the selector 5, and one of the VCs is selected and connected to the application program apparatus 4 under the control of the line control section 6.

The operation of the system having the above arrangement will be described in detail next.

In the ATM network 3, an ATM cell consisting of a header to which line information and the like are added and a payload in which transmission information is stored is transmitted/received as a transmission signal. The line information added to the header of an ATM cell consists of a virtual path identifier (VPI) and a virtual channel identifier (VCI) for identifying a virtual path (VP) and a virtual channel (VC), respectively, to which the ATM cell belongs. VPIs and VCIs are used to identify the VCs between the server terminals 2-1 to 2-n and the application program apparatus 4 of the client terminal 1, and line connection control is performed on the basis of the resultant pieces of information.

The application program apparatus 4 stores data and program information required for the execution of an application in the payload of an ATM cell and transmits the cell to one of the server terminals 2-1 to 2-n.

The line control section 6 always monitors the server terminals, line states, and the like. The selector 5 performs line switching to select a normal line under the control of the line control section 6, thereby transmitting/receiving ATM cells through a normal VC. When, for example, a line is be connected between the application program apparatus 4 and the server terminal 2-1, the selector 5 adds VC-1 to the VCI field of the header of an ATM cell output from the application program apparatus 4, and transmits the resultant cell.

The server terminal 2-1 connected to the application program apparatus 4 receives the ATM cell through VC-1 and extracts the necessary data and the like. The server terminal 2-1 transmits, to the client terminal 1 through VC-1, an ATM cell having a payload in which data and the like corresponding to the service to be provided are stored. The ATM network 3 performs switching processing in accordance with the network size, and transmits the ATM cell to the selector 5. The selector 5 sends the ATM cell from the ATM network 3 to the application program apparatus 4. The application program apparatus 4 extracts the required data and the like from the received ATM cell and performs desired processing in accordance with the application program.

The operation of the line control section 6 for monitoring server failures and the like and performing switching control will be described next.

In the normal operation, the ATM network 3 constantly transmits/receives OAM (Operation, Administration and Maintenance or Operation And Maintenance) cells in which pieces of administration, maintenance, and monitoring information, e.g., pieces of information indicating terminal operation states and the state of transmission path in the network or at the ATM terminals, are stored. The line control section 6 uses these pieces of maintenance and monitoring information to perform switching control.

Referring to FIG. 2, the line monitoring section 8 of the line control section 6 extracts an OAM cell from the transmission path to check the normality and the like of the server terminal and the line. If abnormality is detected in the VC in use or the server terminal as a result of the normality check performed by the line monitoring section 8, the selector control section 9 controls the selector 5 to switch the VC, in which the abnormality is detected, to a VC in which no abnormality is detected as a result of a normality check. In this manner, the line control section 6 performs line control to connect a line between the server terminal connected to the normal VC to the application program apparatus 4.

More specifically, the line control section 6 adds a VCI indicating VC-2, as the VC in the header of an ATM cell, to an ATM cell sent from the application program apparatus 4, and transmits the cell to the ATM network 3, thereby transmitting the cell to the server terminal 2—2 which operates normally.

Figure 3:
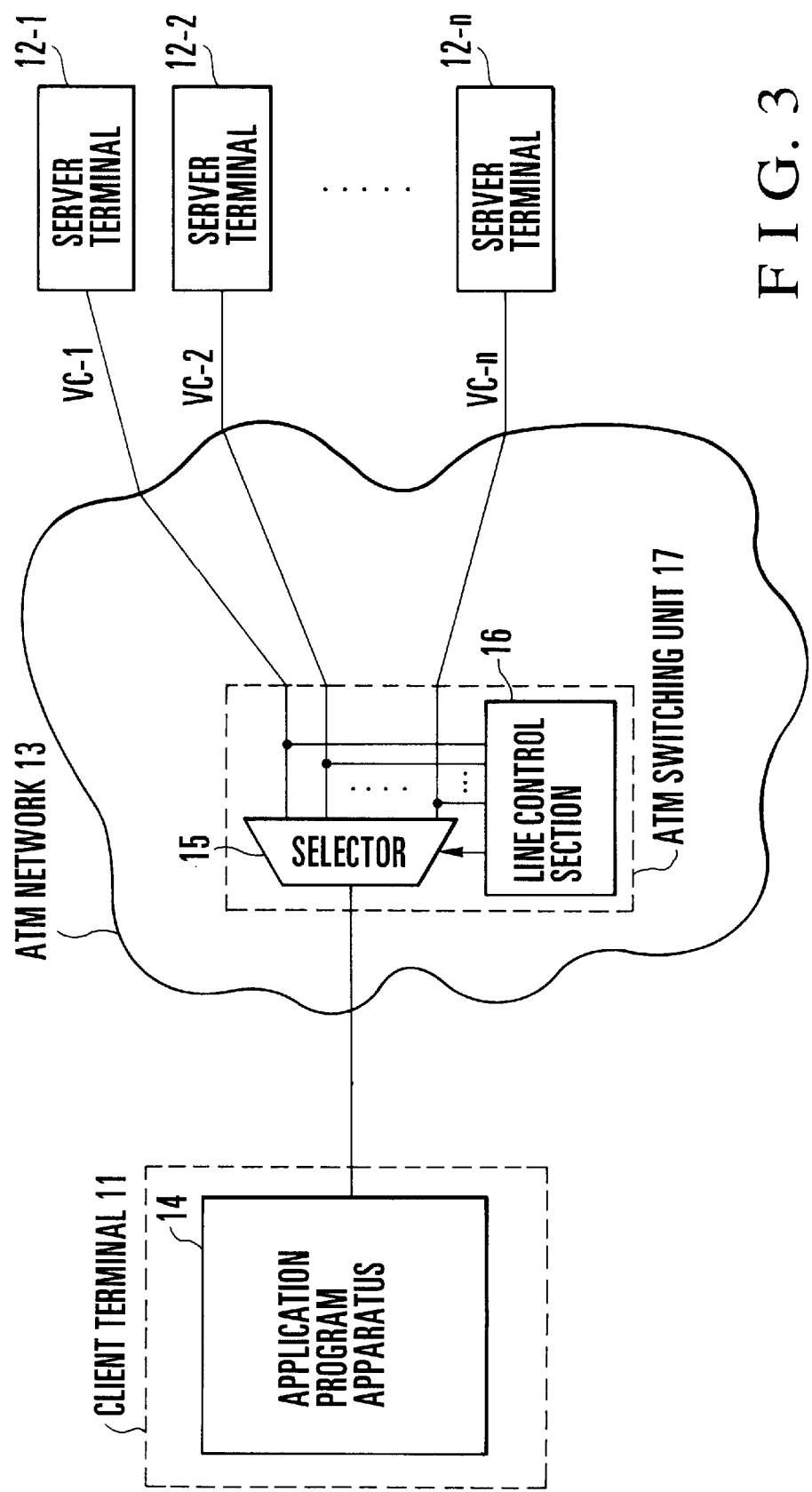
FIG. 3 is a block diagram showing the schematic arrangement of a network server redundancy configuration system according to the second embodiment of the present invention.

FIG. 3 shows a network server redundancy configuration system according to the second embodiment of the present invention.

In the second embodiment, a selector 15 and a line control section 16 are arranged in an ATM network 13 instead of a client terminal 11 having an application program apparatus 14. The selector 15 and the line control section 16 include an ATM switching unit 17 and the like. Reference numerals 12-1 to 12-n denote server terminals. The line switching control operation in the second embodiment is the same as that in the first embodiment shown in FIGS. 1 and 2, and a description thereof will be omitted.

Figure 4:
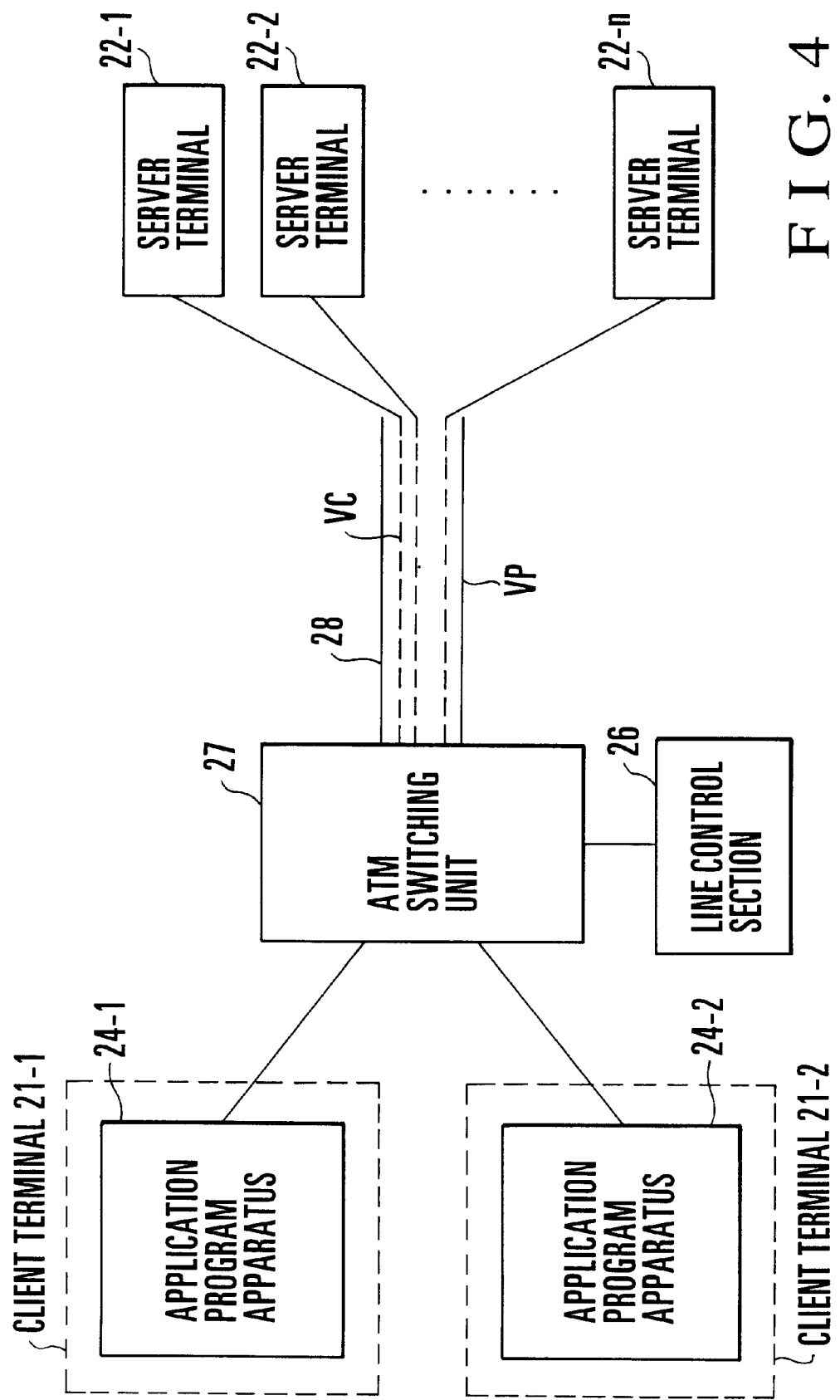
FIG. 4 is a block diagram showing the schematic arrangement of a network server redundancy configuration system according to the third embodiment of the present invention.

FIG. 4 shows the schematic arrangement of the third embodiment of the present invention which is constituted by a plurality of server terminals and a plurality of application program apparatuses.

The third embodiment has a system configuration in which a plurality of client terminals 21-1 and 21-2 respectively having application program apparatuses 24-1 and 24-2 are connected to a plurality server terminals 22-1 to 22-n through an ATM switching unit 27 having a line control section 26, together with a transmission path 28 and the like. The client terminals 21-1 and 21-2 use a plurality of server terminals, of the server terminals 22-1 to 22-n, which operate normally.

In the third embodiment, the client terminals 21-1 and 21-2 transmit ATM cells to the server terminals 22-1 to 22-n, and the ATM switching unit 27 adds a VPI and a VCI which correspond to a normal server terminal to the header of each ATM cell and outputs the cell to a predetermined route. The connected server terminals 22-1 to 22-n transmit ATM cells to the client terminals 21-1 and 21-2, and the ATM switching unit 27 adds VPIs and VCIs which indicate the VCs corresponding to the client terminals 21-1 and 21-2 to the headers of received ATM cells, and transmits the cells.

The line control section 26 monitors OAM cells to check the normality of lines and server terminals, and controls the ATM switching unit 27 to select VPIs and VCIs which indicate normal VCs, thereby connecting the client terminals 21-1 and 21-2 to the corresponding ones of the server terminals 22-1 to 22-n, as in the above case.

In each embodiment described above, the method of monitoring OAM cells is used as a method of detecting failures by using the line control section. However, as a method of monitoring failures, monitoring methods other than the method of monitoring OAM cells can be used.

The following two methods are mainly used as methods of detecting failures by monitoring server terminal failures. These methods will be described with reference to FIG. 2.

(1) The line monitoring section 8 of the line control section 6 inquires of each server terminal as to its normality, and receives an answer about the normality from the server terminal, thus monitoring the state of the server terminal. In this case, ATM cells or packet signals are used to transmit the inquiry and the answer.

(2) Each server periodically transmits a confirmation cell or packet in which information about normality is stored to the line monitoring section 8. When no confirmation cell or packet arrives, the line control section 6 determines that the server terminal has failed.

In addition, as a method of monitoring a line state, a method of determining the disconnected state or the like of a cable on the basis of the presence/absence of the carrier of a received signal is used. Alternatively, a line state may be determined by monitoring the signal level of a transmission path.

In each embodiment described above, in the event of a line or server terminal failure, line switching is performed by switching VCs by changing the VPI and VCI, and addition or switching of VPIs and VCIs is performed by the line control section. For this reason, the application program apparatus which operates on the client need not recognize switching of server terminals, and can operate as if to always use one server terminal. Therefore, the load on the application program which operates on the client can be reduced.

As has been described above, according to the present invention, with the use of a plurality of virtual channels (VCs) of the ATM network, server switching is performed by the line control section instead of the application program. Since the line control section is generally realized by hardware logic, server switching can be quickly performed as compared with that performed by the application program. In addition, the load of server switching which is imposed on the application program operating on the client can be reduced.

What is claimed is:

1. A network server redundancy configuration method of executing a client-server application in a network system comprising a client terminal including an application program apparatus for executing a client-server application, a plurality of server terminals for providing services to said client terminal, an Asynchronous Transfer Mode (ATM) network comprising a plurality of virtual channels which are connected to the servers terminals, a selector for connecting the virtual channels to said application program apparatus of said client terminal, and a line control section for controlling connection of the virtual channels to the application program apparatus of said client terminal, said method comprising the steps of:

connecting said application program apparatus of said client terminal to one of said server terminals through one of said virtual channels of said ATM network;

monitoring the server terminal and the virtual channel connected to the client terminal, using said line control section, to detect a server terminal failure or a virtual channel failure; and performing switching control, using said line control section, on said selector by controlling which of said virtual channels is connected to said application program apparatus based on the results of said monitoring step.

2. A method according to claim 1, wherein the step of monitoring comprises the step of monitoring cells which are transmitted to and received from said ATM network and which contain information indicating an operation state of said service terminal connected to said application program apparatus and a state of a virtual channel connecting said service terminal to said application control apparatus.

3. A network server redundancy configuration system for executing a client-server application comprising:

a client terminal comprising an application program apparatus for executing a client-server application;

a plurality of server terminals for providing services to said client terminal;

an ATM (Asynchronous Transfer Mode) network comprising a plurality of virtual channels for connecting said client terminal to one of said server terminals;

a selector located in said client terminal or between said ATM network and said client terminal;

line monitoring means for monitoring cells transmitted to and received from said ATM network containing information indicating an operation state of a server terminal and a state of a virtual channel; and selector control means for controlling which virtual channel is connected to said application program apparatus of said client terminal to perform switching control on said selector so as to switch which virtual channel said client terminal connected to when at least one of a server terminal failure and a virtual channel failure is detected by said line monitoring means.

* * * * *

UNITED STATES PATENT AND TRADEMARK OFFICE
CERTIFICATE OF CORRECTION

PATENT NO. : 5,991,892
DATED : November 23, 1999
INVENTOR(S) : Masahiko HONDA

It is certified that error appears in the above-identified patent and that said Letters Patent is hereby corrected as shown below:

Title page item [30], Foreign Application Priority Data, change "Jun. 11, 1997" to --Jun. 11, 1996--.

Signed and Sealed this

Seventh Day of November, 2000

Attest:

Q. TODD DICKINSON

*Attesting Officer*  *Director of Patents and Trademarks*